United States Patent [19]

Mitchell

[11] Patent Number: 5,685,461
[45] Date of Patent: Nov. 11, 1997

[54] APPARATUS FOR DISPENSING A UNIFORM VOLUME OF GRANULAR MATERIAL

[76] Inventor: Terry Mitchell, 2407 Traymore Rd., Cleveland, Ohio 44118

[21] Appl. No.: 448,135

[22] Filed: May 23, 1995

[51] Int. Cl.$^6$ .......................................................... B67D 5/06
[52] U.S. Cl. ........................... 222/184; 222/336; 222/361; 222/449
[58] Field of Search ................................... 222/184, 336, 222/344, 361, 362, 448, 449

[56] References Cited

U.S. PATENT DOCUMENTS

| | | | |
|---|---|---|---|
| 1,361,146 | 12/1920 | Egnatoff | 222/441 X |
| 1,880,823 | 10/1932 | Cooper | 222/361 X |
| 1,904,756 | 4/1933 | Wooster | 222/361 X |
| 1,968,641 | 7/1934 | Greig | 222/361 X |
| 2,240,030 | 4/1941 | Bobrick et al. | 222/361 X |
| 2,706,585 | 4/1955 | Bean | 222/336 |
| 2,763,271 | 9/1956 | Nelson | 222/184 X |
| 3,185,190 | 5/1965 | Crawford | 222/361 X |
| 5,421,491 | 6/1995 | Tuvim et al. | 222/336 |

FOREIGN PATENT DOCUMENTS

| | | | |
|---|---|---|---|
| 602795 | 3/1960 | Italy | 222/336 |
| 977574 | 12/1964 | United Kingdom | 222/336 |
| 1046136 | 10/1966 | United Kingdom | 222/336 |

Primary Examiner—Joseph Kaufman
Attorney, Agent, or Firm—Chattman, Gaines & Stern

[57] ABSTRACT

An apparatus that consistently dispenses a predetermined volume of granular material into a receptacle, e.g., a coffee cup. The apparatus including container, guide, housing of three integral horizonal sections, plunger, spring and pin. Container stores granular material, e.g., sugar. Directly below container and secured tightly thereto cylindrical guide substantially same diameter as container neck and having vertically disposed opening therethrough. Guide can have funnel for directing granular contents toward opening. Directly below guide and tightly secured thereto is cylindrical housing. Upper section has guide way and stepped down opening in housing wall. Opposite this opening is pin partially embedded into housing wall and projecting into the guide way. Middle section of housing has vertically disposed outlet offset guide opening. Lower section of housing is substantially deep and has at least one perforation for directing steam out of housing. L-shaped plunger has vertically disposed passage of predetermined size. Thicker portion of plunger having passage fits tightly into guide way and push portion of plunger fits tightly into stepped down opening and projects outwardly from housing. Plunger has socket on interior end directly adjacent pin. In normal position, spring has one end seated in socket and other end around pin and seated in a groove, and plunger passage aligns with guide opening for granular material to drop into and fill. Pressure on push portion of plunger moves it inwardly in guide way until it abuts housing wall, compressed spring and pin fit into socket and groove, passage is aligned with outlet and contents drop out. Release of pressure on plunger allows spring to urge plunger back to normal or filling position.

10 Claims, 4 Drawing Sheets

APPARATUS FOR DISPENSING A UNIFORM VOLUME OF GRANULAR MATERIAL

TECHNICAL FIELD

The present invention relates generally to dispensers, and more particularly to an apparatus for storing and dispensing a uniform volume of granular material directly into a receptacle.

BACKGROUND OF THE INVENTION

A large number of coffee or tea drinkers prefer to have these particular beverages sweetened with either sugar or a sugar substitute, e.g., SWEET'N LOW® brand low calorie sugar substitute, and powdered creamer. There are a variety of means for providing sugar and/or powdered cream into a beverage container. This choice often depends on whether one is at home or in a commercial setting.

At home, one uses a sugar bowl for the daily storage of sugar and a sugar spoon or teaspoon as a means for transferring a measured amount of sugar from the sugar bowl to one's coffee or tea cup. Quite often during this transfer of sugar, sugar misses the spot, spills onto the counter, creating a mess and resulting in less than the measured amount of sugar being placed in the beverage cup. Mother problem encountered is the "sugary spoon." The sugary spoon is a result of the steam from a hot beverage condensing on the spoon and then upon reinsertion of the spoon in the sugar bowl sugar sticking to the spoon. Once the spoon is "sugary" it becomes difficult to measure the desired amount of sugar. In addition, contamination of the sugar is possible.

In the commercial setting, either sugar or creamer packets or large glass dispensers having a metal lid and spout are used. The packets are ripped open and some or all of the contents poured into the beverage cup. The use of packets creates a mess in that the empty or partially empty packets remain and must be disposed of somehow somewhere. Today, with numerous manufactures of the individualized sugar packets, it has been found that each manufacturer has a different volume of sugar in its packets, i.e., inconsistent volumes. In addition, packets are paper and their manufacture is an environmental concern. Quite often when one uses these packets, one does not pour out every grain so again granular material can be spilt all over a counter. Alteratively, use of the dispenser requires one to pour the granular material out a spout and into a spoon if one desires a measured amount of the granular material or one pours the sugar and/or creamer directly into the beverage container. Steam from the hot beverage usually condenses on the teaspoon, the metal lid and/or the spout of the dispenser thereby creating clumps. Each of these conventional means of trying to provide a uniform volume of sugar and/or creamer to a beverage container results in inconsistent amounts actually being placed in the container and/or the disposal of partially empty packets and a mess.

DISCLOSURE OF THE INVENTION

The present invention overcomes these problems with an apparatus that consistently dispenses a uniform volume of sugar or any granular material directly into a receptacle. The apparatus can be easily used with one hand, use of the apparatus avoids the counter top mess. The apparatus stores granular material in a sized passage ready for the user to immediately dispense a predetermined amount of granular material with each operation of the dispenser. The apparatus prevents contamination of the granular material. The apparatus is provided with a means for directing steam out of the apparatus so as to prevent the creation of clumps of sugar.

In general, the apparatus consists of a container for storing the dry granular material, a plunger having a passage sized to receive and to dispense a uniform volume of material, a guide below the container that directs the material toward the passage and provides tight tolerances, a housing below the guide that accommodates the plunger in either of two positions, normal and dispensing, a compression spring that positions the plunger, a pin that prevents the spring from buckling and a substantially deep base having at least one perforation for directing steam away from the interior of the housing.

The preferred embodiment of the present invention provides for an apparatus that has a container having a circular neck. The container receives and stores the granular material. Tightly secured to the container is a guide. The guide, positioned below the container, is substantially the same diameter as the neck of the container. The guide is cylindrical and has a vertically disposed opening therethrough. Directly below the guide is a cylindrical housing. The housing is divided horizontally into three integral sections, upper, middle and lower. The upper section tightly secures to the guide. The upper section is primarily a guide way. There is an opening in the housing verticle side wall. The middle section has a vertically disposed opening or outlet parallel to and backwardly offset from the opening in the guide. The lower section is substantially deep, hollow and has at least one perforation or hole in the housing verticle side wall for directing steam out of the lower section of the housing. The housing comprises a projection partially embedded in the upper section vertical housing side wall directly opposite the opening in the housing side wall. It partially projects into the guide way. Bound the projection is a groove. The apparatus further includes a compression spring. An L-shaped plunger has two integral portions, a thick portion having a passage sized to contain and dispense a predetermined volume of granular material and a thin portion extending exteriorly of the housing. The thick portion of the plunger having the passage fits tightly into the guide way. Horizontally positioned in the thick portion is a socket and directly opposite the socket is the projection. The thin portion of the plunger fits tightly through the housing verticle side wall opening and extends outwardly from the housing thereby creating a push end of the plunger. In a normal position, the passage in the plunger aligns with the guide opening so that some of the granular material stored in the container drops only into the passage until the passage is full. In the normal position, one end of the spring fits over the projection and into the groove and the other end is seated in said plunger socket. In the dispensing position, the plunger passage aligns directly over the outlet of the middle section and the projection fits into the socket and the spring is compressed and within the groove and the socket. When granular material is desired in a receptacle, the plunger is pushed inwardly by external pressure against the tension of the spring. The plunger slidable moves backwardly in the guide way to the dispensing position. In the dispensing position, the granular material in the passage drops out of the lower hollow section of the housing and into a receptacle. When pressure on the plunger is released, the spring urges the plunger forwardly to the normal position.

A further aspect of the apparatus is that the container neck is exteriorly screw-threaded and the guide is hollow having the vertically disposed opening in the closed end and is internally screw-threaded inside the open end. In another aspect the guide contains a funnel. The funnel directs the granular material from the container toward the guide opening. Another aspect of the apparatus is the opening in the housing verticle side wall is stepped down and the sides of the push portion of the plunger are stepped down for tight fitting of the push portion through the housing verticle side wall.

The apparatus of the invention can dispense a half a teaspoon of sugar, a half a gram of sugar substitute or a half a teaspoon of creamer. Holding the dispenser in one hand, the user positions the dispenser over a beverage container, e.g., a coffee cup, and presses the plunger until it abuts the interior of the housing wall. In this position, the passage and outlet are aligned and the granular material drops out into the coffee container. Release of the plunger allows it to automatically return to the filling position. If a second teaspoon of sugar is desired, the user then presses the plunger again until it abuts the housing wall. A second teaspoon of sugar drop out and into the coffee cup. Any steam from a hot coffee cup moves out of the housing through the hole or holes in the lower section so as not to condense within the dispenser. The dispenser eliminates the need for teaspoons, paper packets of sugar and creamer and other sugar or creamer dispensers. The dispenser consistently delivers a predetermined volume of granular material to an awaiting receptacle below.

The above and other features and advantages of the invention will become better understood from the detailed description that follows, when considered in connection with the accompanying drawings.

BEST MODE FOR CARRYING OUT THE INVENTION

Figure 1:
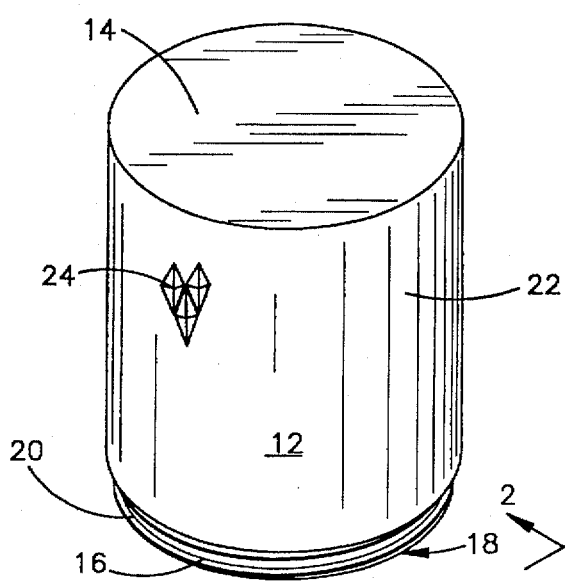
FIG. 1 is an exploded view of one embodiment of a dispensing apparatus.
Figure 1:
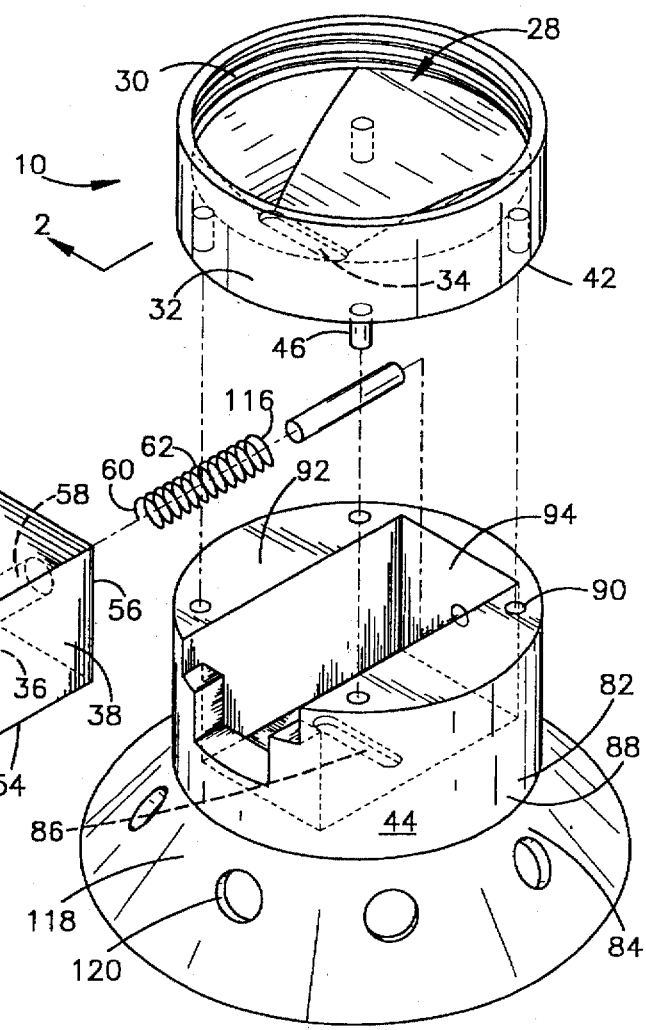
Figure 2A:
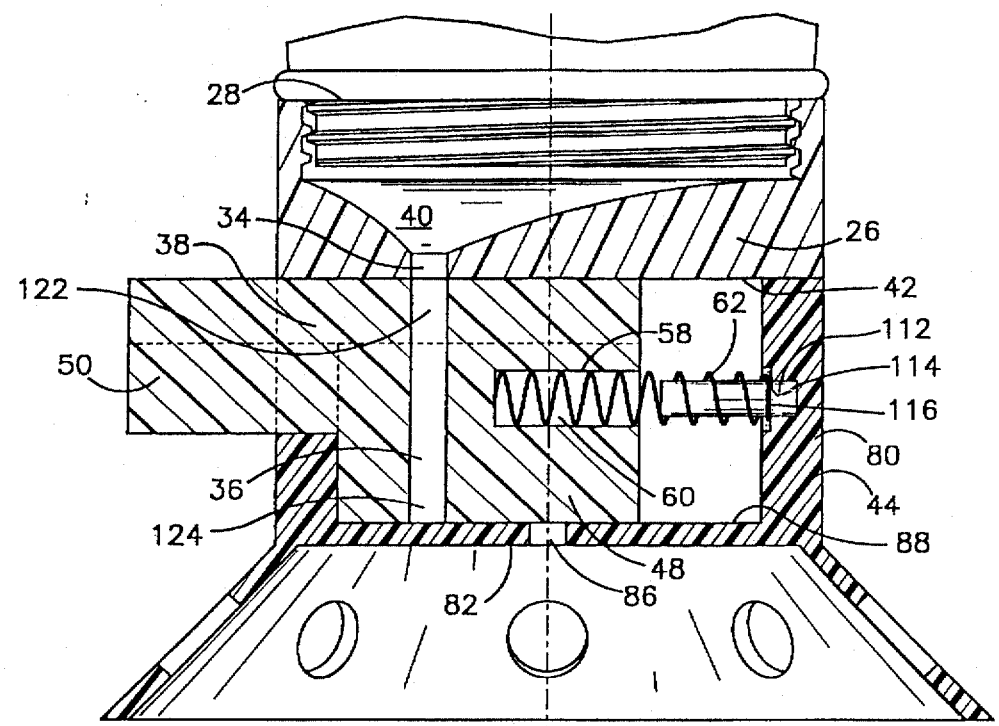
FIG. 2A is a sectional view of a guide, housing and a plunger in the normal filling position taken along the 2—2 line.
Figure 2B:
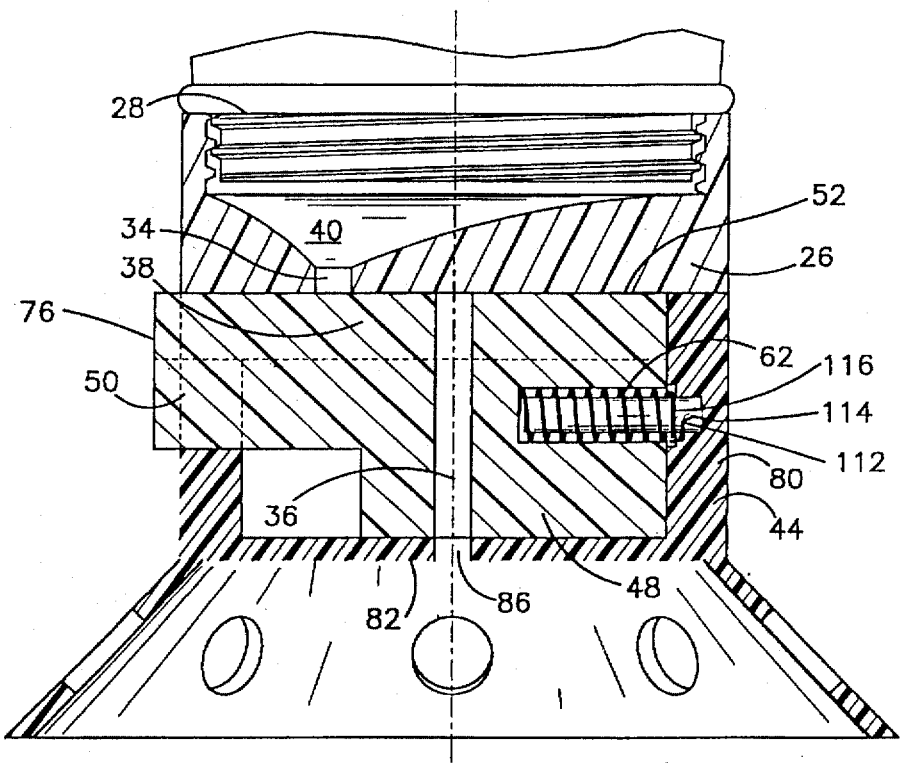
FIG. 2B is a sectional view of the housing and the plunger in the dispensing position taken along the 2—2 line.
Figure 4:
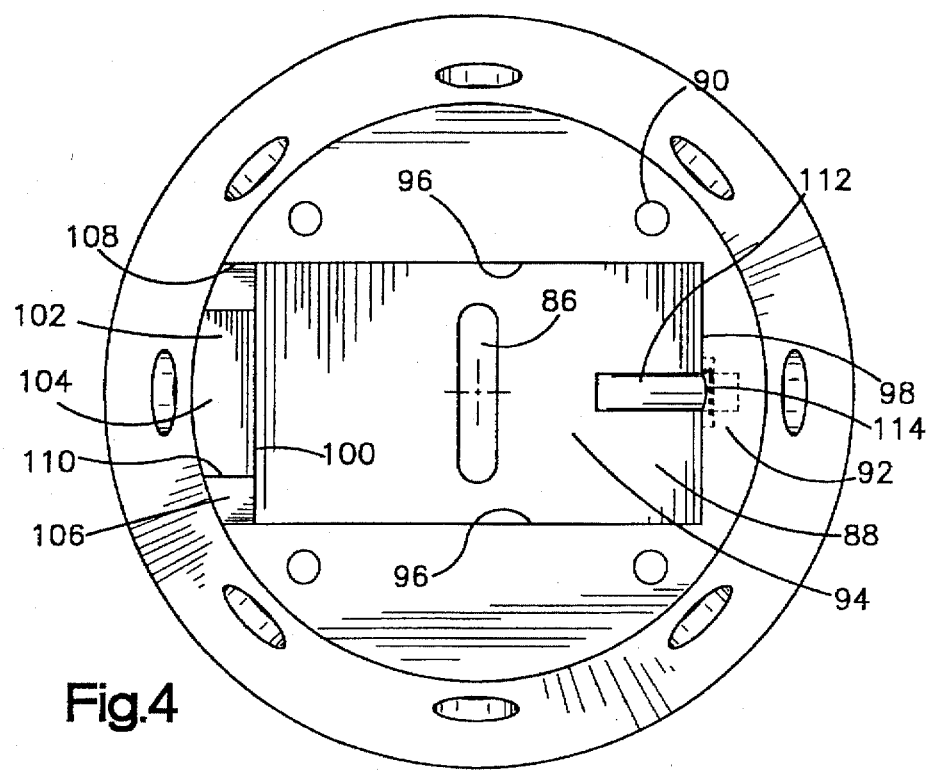
FIG. 4 is a top plan view of the housing with the plunger.
Figure 5:
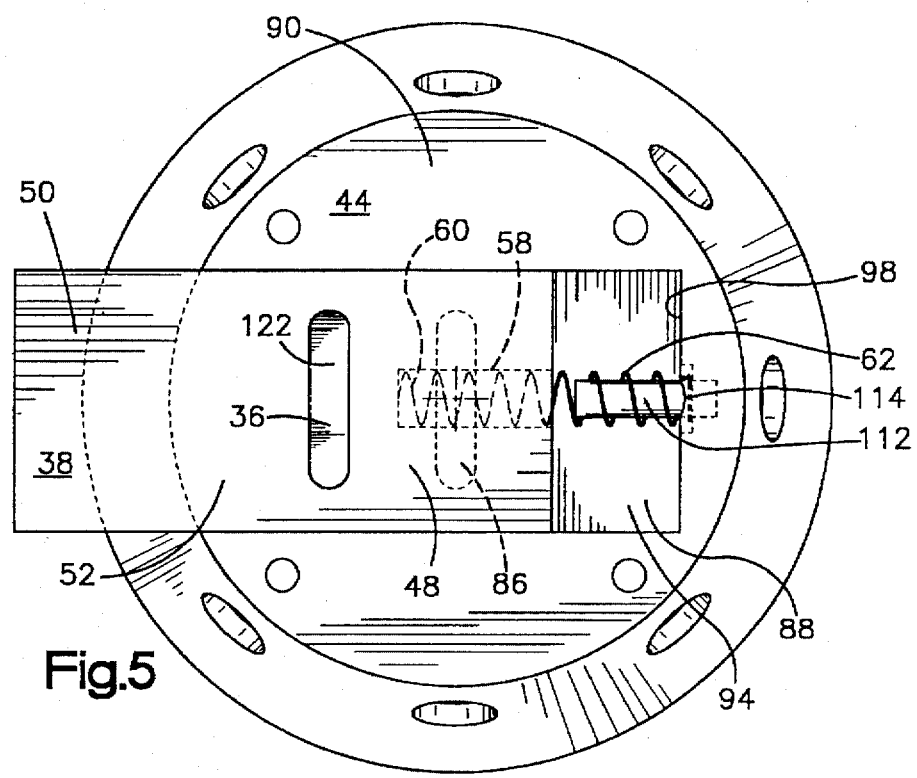
FIG. 5 is a top plan view of the housing.

A dispensing apparatus 10 embodying the present invention is shown in FIGS. 1, 2A and 2B comprising a hollow receptacle 12 for storing dry granular material. The receptacle 12 is closed at one end 14 and open at one end 16. The open end or mouth 16 is circular and through which the granular material is introduced. Above the mouth 16 of the receptacle 12 is a neck 18 which is externally screw-threaded 20. The mouth and the neck are substantially the same size in diameter. The midsection 22 of the receptacle 12 can be enlarged, stepped-up or pear-shaped compared to the neck and receptacle mouth in order to provide the user with a good grip when holding the dispenser. The exterior of the receptacle can be provided with some protrusions 24 to indicate to the user the particular contents of the dispenser, e.g., star protrusions to indicate sugar and stripe protrusions to indicate a creamer. It is desirable to store the granular material in a closed container in order to prevent contamination of the granular material. The receptacle 12 can be glass, plastic, metal or other suitable material.

The dispenser 10 additionally includes a hollow cylindrical guide 26 which is open at the top 28. The guide 26 has substantially the same diameter as the diameter of the receptacle mouth 16. The guide is detachably securable to the receptacle, preferably, the interior verticle wall of the guide, either partially or completely, is provided with screw-threads 30 adapted to receive the receptacle screw-threads 20. The lower surface 32 of the guide 26 is provided with a vertically disposed opening 34 therethrough for directing the granular material into a passage 36 of a plunger 38. The opening 34 is not centrally located on the lower surface although the opening can be positioned centrally. The guide is provided with a funnel 40 extending downwardly that directs the contents of the receptacle 12 down into opening 34. The lower exterior surface 42 of the guide 26 is provided with a means of fixedly attaching the guide to housing 44, e.g., at least two preferably four downwardly depending pegs 46. The guide must be secured to the housing and preferably must be tightly securable to the housing. The guide 26, funnel 40 and pegs 46 can be made of plastic, glass, metal or any other suitable material.

Figure 3:
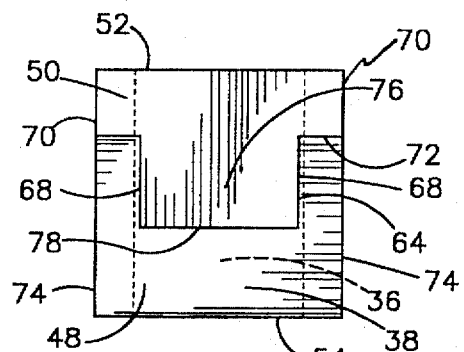
FIG. 3 is a front plan view of the plunger and the runner.
Figure 6:
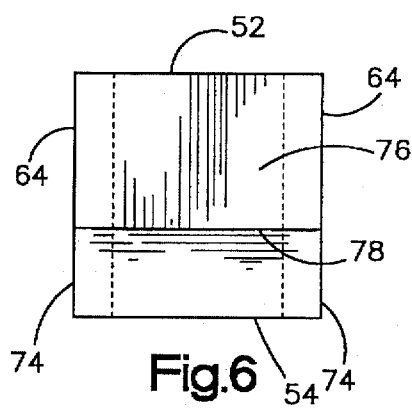
FIG. 6 is a from plan view of the plunger without the runner.

The dispenser 10 further includes a plunger 38 that is L-shaped when viewed from the side. This L-shaped of the plunger provides two integral portions, a thick portion 48 and a thin push portion 50. The thick portion 48 is provided with a vertically disposed passage 36. The passage 36 is sized to receive, contain and dispense a predetermined volume of the granular material, e.g., a half teaspoon or a teaspoon. The passage 36 extends through the plunger from the upper surface 52 to the lower surface 54. The width of the thick portion of the plunger is dependent on the size of the passage. The inside end surface 56 of the plunger thick portion is provided with a socket 58 sized to seat one end 60 of a compression spring 62 and protrusion 112 when the plunger is positioned in the filling position in the housing 44 as shown in FIG. 2A. Integral with the thick portion is the push portion of the plunger. Each side 64 of the push portion 50 of the plunger 38 can be smooth as shown in FIG. 6 or a runner 66 as shown in FIG. 1. The lower portion 68 of the runner is narrower than the upper portion 70 of the runner although each can be the same width. FIG. 3 shows the front view of the stepped down push portion of the plunger and lip 72. The plunger surfaces are each flat and parallel to the opposite surface, upper 52 and lower 54, sides 74, 74, 68, 68, 70 and 70, end 56 and end 76 and surfaces 78 and 52. These flat surfaces are machined to ensure the tight tolerance of the plunger within the housing 44, i.e., the parts are machined to a thousandth of inch. The plunger is made of plastic or other suitable material.

The dispenser 10 further includes a cylindrical housing 44. The housing consists of an upper portion 80, a middle portion 82 and a lower portion 84. The middle portion 82 is integral with the upper portion 80 and the lower portion 84. The middle portion 82 of the housing is essentially a plate having a vertically disposed opening 86 therethrough and backwardly offset the opening in the guide, preferably, centrally positioned through the middle portion. The upper surface 88 of the middle portion is the lower surface of the upper portion. The upper portion is essentially open at the top and securable to the guide, e.g., at least two inlets 90 are provided for receiving the pegs 46. It is desirable to have the exterior lower surface 42 of the guide and the upper surface 92 of the housing fit together as tightly as possible. The upper portion 80 of the housing 44 is provided with an interior cavity or guide way 94 for the plunger thick portion 48. The cavity 94 is formed by the surface 88 and side walls, 96, 96, and verticle side walls 98 and 100. The cavity is sized to allow the thick portion 48 of the plunger to be positioned tightly within for slidably move forwardly and backwardly between a normal or filling position and a dispensing position within the cavity and on the upper surface 88 of the middle portion 82 of the housing. The width of thick portion is the same as the depth of the cavity within the upper portion. With the plunger positioned in the cavity the upper surface 52 of the plunger and the upper surface 92 of the housing are smooth and level. The tolerances between the guide's exterior lower surface 42 and the plunger surfaces 52, 74, 74, and 54 the sides 96 and 96, the upper surface of the housing 92 and end wall 100 of the cavity and the upper surface 88 of the middle portion are to be so tight that thee is no "wiggle" room for any sideways or up and down movement of the plunger within the cavity 94. The only movement possible within the guide way or cavity is the forward and backward movement of the plunger from the normal or filling position to the dispensing position and the return to the normal position. The front side verticle wall 100 of the housing is provided with a partial opening 102 or stepped down opening for the plunger push portion 50 to project outwardly of the housing 44. The push portion 50 rests partially on a shelf 104 and a ledge 106 of the housing side wall. More particularly, the lip 72 of the push portion rests on the ledge 106 and the lower surface 78 of the push portion rests on the shelf 104 and the upper surface 52 of the plunger is directly below the guide exterior lower surface 42. The upper side of the runner 70 is adjacent the upper side 108 of the opening in the wall and the lower side of the runner 68 is adjacent the lower side 110 of the opening 102 in the wall 100. The push portion of the plunger extends through the stepped down opening in the housing verticle side wall and outwardly the housing. The stepped down opening 102 in the housing wall and the stepped down runner 66 of the plunger are machined to the thousandth of an inch to provide for tight tolerances. The plunger is not to "wiggle" in the opening. Provided directly adjacent the opening 102 in the extreme inward verticle side wall 98 of the upper portion 80 is a pin 112. The pin 112 is partially embedded into the inner wall 98 and partially projects into the cavity 94. Around the pin 112 in the vertical housing side wall 98 is a groove 114. The dispenser 10 further includes a compression spring 62. The spring 62 has two ends, one end 116 is positioned in the groove 114 and around the pin 112 and the other end 60 is seated within the socket 58 of the plunger to prevent the spring from buckling and as well as to maintain the position of the spring when the spring is compressed in the dispensing position. The size of the spring is determined by the force required to reposition the plunger from the dispensing position to the normal position so as to register passage 36 with opening 34 and thereby close opening 86. The lower portion of the housing 84 is hollow. It is sufficiently deep, as indicated by 118, the depth of the lower portion of the housing is preferably one half to three quarters of an inch, and is provided with at least one perforation 120, preferably quite a few perforations for allowing any steam contained in the lower portion to be directed out of the housing 44. The housing 44 is adapted to be placed on a level surface, e.g., a counter surface. The housing 44 is made of plastic or other suitable material. The spring 62 and pin 112 are stainless steel if food is to be dispensed from the apparatus.

The guide opening 34, the plunger passage 36 and the housing opening 86 have the same exterior shape and are positioned so that the passage 36 aligns exactly with either opening 34 or 86 when the passage is positioned in the either the filling position, FIG. 2A, or the dispensing position, FIG. 2B, thereby preventing the leaking of any grains of material onto surfaces 42, 52, 92, 96, 96, 74, 74, 100, 88, and 54 and jamming the plunger. Each of these surfaces is in tight tolerance with the adjacent surface.

When the plunger is in the normal or filling position, the push portion 76 of the plunger is exteriorly projecting outwardly of the housing, the receptacle 12 is full of granular material and the passage 36 registers with the guide opening 34 by the tension of the spring 62. As shown in FIG. 2A, the upper portion of the passage 122 is aligned with the inlet 34 and the lower portion 124 of the passage is closed off by the upper surface 88 of the middle portion. One end 60 of spring 62 is seated in socket 58 of the plunger and the other end 116 is positioned around pin 112 and seated in the groove 114. In this position, sugar or creamer is adapted to be directed by the funnel 40 from the receptacle 12 through the inlet 34 into the passage 36 for measuring a uniform quantity. The passage fills and remains in a ready state. When the plunger is in the dispensing position, FIG. 2B, the passage 36 is positioned to register with the outlet 86, the opening 34 is closed by plunger surface 52 and the pin 112 and spring 62 are within the socket 58 of the plunger and the groove 114 of the upper housing vertical side wall.

When a predetermined amount of the granular material is desired, the user holds the dispenser 10 above a cup and exerts pressure inwardly on the push portion of the plunger. Movement of the plunger passage from the normal position to the dispensing position is accomplished with inward pressure on surface 76 against the tension of spring 62. This pressure slidably moves the plunger inwardly within the guide way 94 until the end wall 56 of the plunger abuts the inner wall 98 of the housing cavity and against the force of the compression spring 62. In this position, the lower portion 124 of the passage 36 aligns with the outlet 86, the upper portion of the passage 122 is cut off from the inlet 34 by surface 42. The pin 112 and the compressed compression spring 62 are now seated within the socket 58 and the groove 114 and the end of the push portion 76 is flush or extends a small distance outwardly from the housing wall and beyond opening 102. The granular material in passage 36 drops out opening 86 and through the lower portion of the housing and into the awaiting cup below. With release of pressure on the push portion 76, the compression spring urges the plunger 38 to return to the normal position where the passage 36 aligns with opening 34 and automatically fills with an additional quantity of sugar. The dispenser is now prepared for a second push of the plunger and the dispensing of a second volume of the desired granular material.

Figure 7:
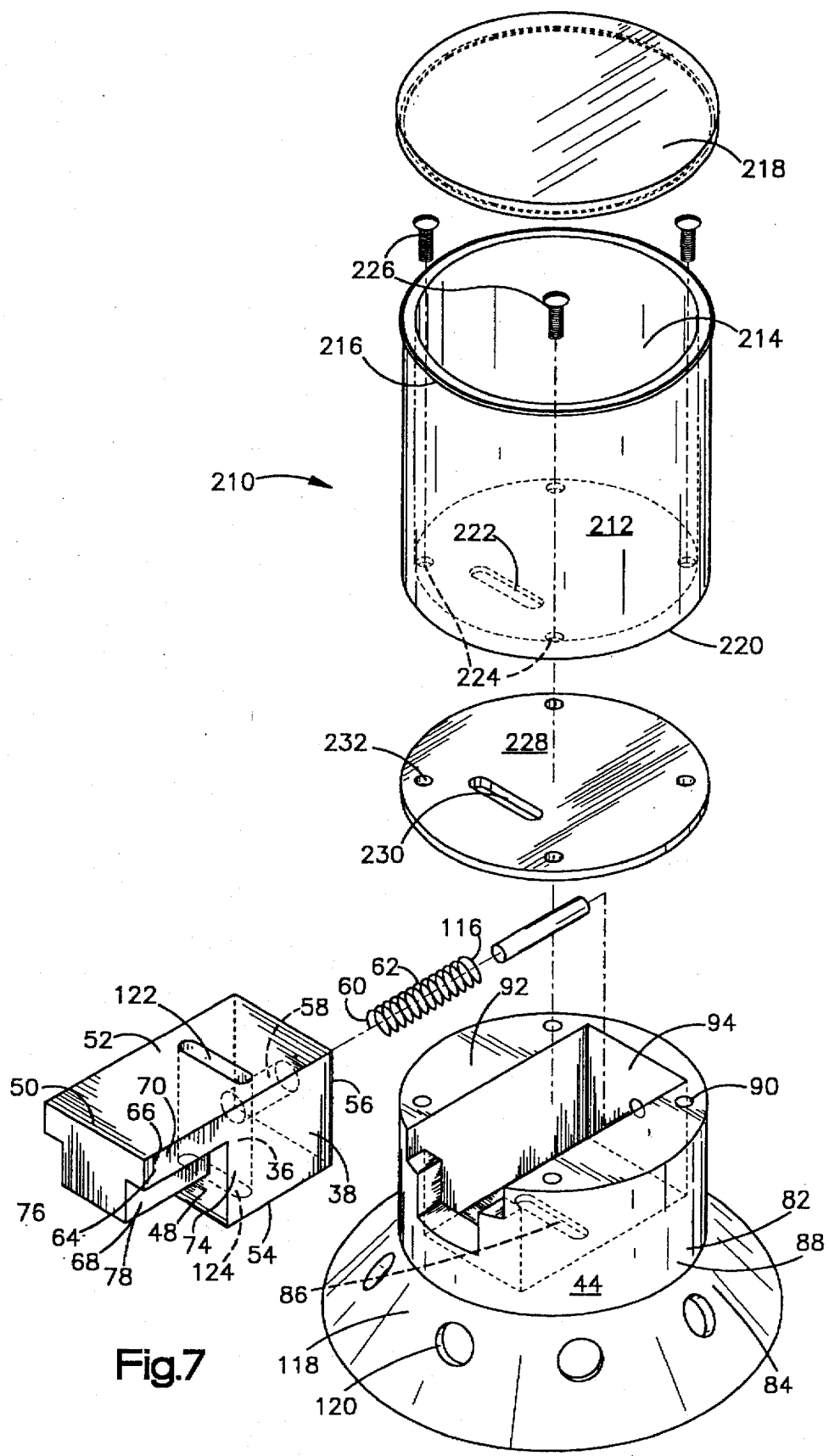
FIG. 7 is an exploded view of a container and guide of second embodiment of the dispensing apparatus.

Another embodiment of the dispenser is partially shown in FIG. 7. The dispensing apparatus 210 consists of a hollow cylindrical receptacle 212 which is open at the top 214 to provide an inlet for introducing the granular material into the container. The opening 214 is provided with a bead 216 for securing a removable lid 218 which is provided for closing the top to prevent the granular material from spilling out of the receptacle 212. The lid also prevents contamination of the granular material. The lower surface 220 of the receptacle is provided with a vertically disposed opening 222 for the movement of the granular material out of the receptacle 212. The lower surface 220 is also provided with at least two holes 224 for screws or snaps 226 or any other means of securing. The receptacle and lid are made of plastic, glass or metal or any other suitable material.

The dispensing device 210 further includes a guide 228 that is directly below and securable by suitable means, e.g., screws 226, to the receptacle lower surface 220. The guide 228 is provided with a vertically disposed opening 230 of substantially the same size and shape as the receptacle lower surface 220. The guide opening 230 and the receptacle opening 222 are directly in line with each other. The guide 228 is provided with at least two holes 232 through which screw or snaps 226 pass. The guide 228 provides tight tolerances between the receptacle and the housing 44. The upper surface of the housing 92 is provided with at least two holes 90 for the screws or snaps 226. The guide is made of plastic, glass, metal or any other suitable material.

The second embodiment has the same housing and plunger as the first embodiment.

EXAMPLE

A hollow container having a 3/16 inch wide and a 3/4 inch long opening in its lower surface is secured by 4 stainless steel screws to a guide and a housing. The container has a bead at its mouth and is covered with a snap-on lid. The guide has a 2¼ inch diameter and has a 3/16 inch wide and 3/4 inch long opening therethrough. The opening is off center.

The housing is cylindrical with a diameter of 2¼ inches and a depth of 2½ inches. The housing has three integral horizontal layers. The upper layer is primarily a guide way. The middle layer is primarily a plate and the lower layer is primarily a hollow base. The housing guide way is approximately 1½ inches long by 1 inch wide by 1 inch deep. A pin is located about 9/32 inch from the housing upper surface and projects about ½ inch into the guide way. The pin is centrally position at the backward end of the guide way wall. There is a groove which rings the pin in the housing. There is a spring 1½ inch long and having a ¼ inch diameter positioned on the pin and in the groove. The opening in the upper housing wall is stepped down 5/8 inch and it is 1 inch wide at the top and 3/4 inch wide at the shelf. The lip is 1/8 inch wide. The middle portion of the housing is a solid with a centrally positioned 3/16 inch wide and 3/4 inch long opening therethrough. The lower portion of the housing is hollow.

The plunger has both a thick portion and a push thin portion integral with each other. When viewed from the side the plunger is L-shaped. The thick portion is a 1 inch cube having a vertical passage 3/16 inches wide and 3/4 inch wide therethrough. A socket is stepped down. The larger outer diameter portion is 5/16 inch and the smaller portion inside diameter is ¼ inch. The larger portion is 5/16 inch deep and the two portions together are ½ inch deep or long. The socket is positioned horizontally in the middle of the inside end of the plunger. When the plunger is fitted tightly into the guide way of the housing one end of the spring fits around the pin and into the groove and the other end is seated in the socket. The push portion of the plunger is 1 inch long and 1 inch wide on the upper surface. The push portion is a runner that is stepped down so as to fit snugly within the stepped down housing vertical wall opening. The upper portion of the runner is 1 inch wide and the lower portion of the runner is 3/4 inch wide. The lips are each 1/8 inch wide. The lower surface of the push portion rests on the shelf of the housing opening and the lips rests on the ledges of the opening of the housing. The push portion of the plunger fits through the housing opening and extends outwardly of the housing wall about 5/8 inch. The guide, plunger and housing surfaces are machined to a thousandth of an inch in order for the tolerances to be very tight. The guide, plunger and housing are made of hard plastic. The receptacle and lid are made of softer plastic. The pin and spring are made of stainless steel.

The normal position of the dispensing apparatus is defined as the plunger passage registering with the guide opening and the container opening and one end of the spring seated in the socket of the plunger and the other end of the spring positioned around the pin and seated in the groove that is projecting into the guide way directly behind the plunger socket. The openings are exactly aligned with each other so that no grains of the material leak onto the plunger or housing surfaces. The dispensing position is defined as the passage registering with the middle portion opening, the plunger end abutting the inside housing wall and the spring seated in the socket and groove and the pin within the socket.

The dispensing apparatus rests on a counter with the receptacle and passage being full of the granular material, i.e., the apparatus is ready to dispense. When the granular material is desired, the user can hold the apparatus over a glass and pushes the plunger inwardly the apparatus. When the plunger can move no further inwardly, the granular material drops out and through the lower portion of the housing and into the awaiting glass. With release of the plunger the spring urges the plunger forward within the guide way to the normal or filling position. Immediately the passage is aligned with the guide and container openings and the granular material falls into and fills the passage. The apparatus is then ready for a second dispensing of the granular material into an awaiting glass.

From the foregoing description of preferred embodiments of the invention it will be apparent that the advantages of the invention heretofore enumerated and others have been accomplished in that there have been provided improved dispensing device for granular materials made by assembling a receptacle, a guide, a housing, a plunger, a pin and a spring. While the preferred embodiments of the invention have been described in considerable detail, various modifications or alterations may be made therein without departing from the spirit or scope of the invention set forth in the appended claims.

What is claimed is:

1. An apparatus for storing and dispensing a uniform volume of granular material, the apparatus comprising:

a. a container for receiving and storing granular material having a circular neck;

b. a guide having a vertically disposed inlet therethrough for passing the granular material from said container, said guide being cylindrical and said guide being directly below and tightly securable to said container;

c. a cylindrical housing having a horizontal upper section, a horizontal lower section, and a horizontal middle section integral with said upper and lower sections, said upper section being directly below and tightly securable to said guide and said upper section having a guide way and a partial opening in said housing vertical side wall, said middle section having a vertically disposed outlet therethrough, said outlet being parallel to and offset from said guide inlet, said lower section being substantially deep and hollow, and said lower section having at least one perforation in said housing wall for directing steam out of said housing;

d. a compression spring;

e. a pin projecting from said upper section vertical housing side wall into said guide way opposite said vertical side wall opening; and f. an L-shaped plunger having a thick portion and a thin push portion integral therewith, said thick portion having a vertically disposed passage therethrough sized for receiving a predetermined volume of granular material from said guide inlet and dispensing the granular material through said outlet, said thick portion being tightly positioned in said guide way for slidable backward and forward movement, and said thick portion having a horizontally disposed socket, wherein said pin being directly adjacent said plunger socket, and said push portion fitting tightly therethrough said housing vertical side wall opening with a lower surface of said push portion resting on a portion of a vertical side wall and said push portion extending through said opening outward from said housing vertical side wall, and wherein a normal position is defined by said plunger passage registering with said guide inlet, and a dispensing position is defined by said plunger passage registering with said housing middle section outlet, wherein when said plunger is in said normal position granular material drops from said container through said guide inlet into said plunger passage thereby filling said passage, when pressure is exerted inwardly on said plunger push portion against the tension of said spring, said plunger slidable moves backward in said guide way to said dispensing position, and the granular material in said passage drops out through said housing lower section outlet, and when pressure on said plunger push portion is released said spring urges said plunger passage forward from said dispensing position until said plunger thick portion abuts said vertical side wall which prevents any further forward movement and said passage registers with said guide inlet.

2. An apparatus according to claim 1, wherein said container neck is exteriorly screw-threaded.

3. An apparatus according to claim 1, said guide being a hollow and further including a funnel positioned for directing granular material in said container into said inlet.

4. An apparatus according to claim 2, wherein said guide is internally screw-threaded to receive said screw-threaded container neck.

5. An apparatus according to claim 1, wherein said container is pear shaped.

6. An apparatus according to claim 1, wherein said opening in said housing verticle wall is stepped down and said plunger push portion sides are stepped down and wherein said stepped down push portion fits tightly through said stepped down housing opening.

7. An apparatus according to claim 1, wherein said pin is made of stainless steel and said housing is made of plastic.

8. An apparatus for dispensing a consistently uniform volume of granular material, the apparatus comprising:
  a. a container for receiving and storing granular material;
  b. a guide having a vertically disposed opening therethrough and wherein in said guide is a funnel for directing the granular material from said container into said guide opening;
  c. an L-shaped plunger having a thick portion and a thin push portion integral therewith, said thick portion having a vertically disposed passage therethrough and a horizontally disposed socket, said passage being sized for receiving and dispensing a predetermined volume of the granular material, and said push portion sides being stepped down;
  d. a cylindrical housing having horizontally positioned upper, middle and lower sections, said middle section being integral with said upper and lower sections, said upper section being below said guide, having a guide way and a stepped-down opening in said housing vertical side wall, and said middle section having a vertically disposed opening offset said guide opening;
  e. a pin being in said upper section side wall directly opposite said stepped-down opening, and projecting into said guide way; and
  f. a compression spring, one end of the said spring being positioned around said pin and said other end being seated in said plunger socket; wherein said plunger thick portion is positioned tightly within said guide way for slidable movement between a normal position and a dispensing position, said push portion extending tightly through said stepped-down opening and outward said housing, wherein a normal position being defined as the alignment of said guide opening and said plunger passage for filling said passage with the granular material and said outward extending push portion partially resting on a stepped-down vertical housing side wall, a dispensing position being defined as the alignment of said passage and said middle portion opening thereby allowing the granular material within said passage to drop out of said passage, and when external pressure is applied to said push portion, said plunger slidably moves in said guide way from said normal position until said plunger abuts said housing verticle wall and said passage aligns with said middle section opening and when the pressure is released on said push portion, said spring urges said plunger forward from said dispensing position until said plunger thick portion abuts said stepped-down vertical side wall which stops any further forward movement of said plunger thick portion and said passage is aligned with said guide opening for immediate filling of said passage.

9. An apparatus according to claim 8, wherein said pin is made of stainless steel and said housing and said plunger are made of plastic.

10. An apparatus for storing and dispensing a consistently uniform volume of granular material, the apparatus comprising:
  a. a hollow cylindrical container for storing granular material, said container having an upper surface and a lower surface, said upper surface is open for receiving granular material and said lower surface having a vertically disposed opening therethrough for passing the granular material out of said container;
  b. a lid for maintaining the granular material within said container;
  c. a guide having a vertically disposed opening therethrough, said opening being directly below said container opening and having the same size and shape as said container opening;
  d. an L-shaped plunger, said plunger having a thick portion and a thin push portion integral therewith, said thick portion having a vertically disposed passage therethrough sized to receive and dispense a predetermined volume of granular material and having a horizontally disposed socket, said passage having the same shape as said guide and container openings, and said push portion of said plunger having stepped-down sides;
  e. a cylindrical housing having a horizontal upper section, a horizontal middle section and a horizontal lower section, said middle section integral with said upper and lower sections, said upper section having a guide way and a stepped-down opening in said housing vertical side wall, and said middle portion having a vertically disposed opening therethrough offset said guide opening;
  f. a pin projecting into said guide way; and
  g. a spring; wherein said thick portion of said plunger fitting tightly within said housing guide way and said push portion fitting tightly through said stepped-down opening with a portion of said lower surface of said push portion resting on a stepped-down vertical housing side wall and projecting through said stepped-down opening outward from said housing wall, and wherein a normal position is defined by said plunger passage registering with said container opening and said guide opening, and said dispensing position is defined by said plunger passage registering with said middle section opening, wherein when said plunger is in said normal position granular material drops through said container opening and said guide opening thereby filling said passage, and when pressure is exerted inwardly on said plunger push portion said passage slidably moves in said guide way to said dispensing position and the granular material in said passage drops out of said passage, and release of pressure on said push portion of said plunger allows said spring to urge said plunger passage forward from said dispensing position until said plunger abuts said stepped-down vertical side wall which prevents any further forward movement of said plunger and said passage registers with said guide opening.

* * * * *